(12) United States Patent
Meier et al.

(10) Patent No.: US 7,577,086 B2
(45) Date of Patent: Aug. 18, 2009

(54) METHOD OF GENERATING A PUBLIC LONG CODE MASK

(75) Inventors: Steven Kent Meier, Batavia, IL (US); Sarvar Patel, Montville, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 867 days.

(21) Appl. No.: 10/824,216

(22) Filed: Apr. 14, 2004

(65) Prior Publication Data
US 2005/0232141 A1    Oct. 20, 2005

(51) Int. Cl.
*H04J 11/00* (2006.01)

(52) U.S. Cl. .............. 370/208; 370/335; 370/441; 455/450; 375/140

(58) Field of Classification Search ............. 370/441, 370/335, 342, 389, 395.3, 395.4, 471, 473, 370/474, 475
See application file for complete search history.

(56) References Cited

U.S. PATENT DOCUMENTS

| | | | |
|---|---|---|---|
| 6,101,176 A * | 8/2000 | Honkasalo et al. | 370/335 |
| 6,438,117 B1 * | 8/2002 | Grilli et al. | 370/331 |
| 6,504,832 B1 * | 1/2003 | Koo et al. | 370/342 |
| 6,519,239 B1 * | 2/2003 | Panchal et al. | 370/335 |
| 6,643,280 B1 * | 11/2003 | Li et al. | 370/342 |
| 2004/0202127 A1 * | 10/2004 | Loh et al. | 370/331 |
| 2004/0213280 A1 * | 10/2004 | Patel | 370/441 |
| 2004/0233863 A1 * | 11/2004 | An et al. | 370/320 |
| 2004/0259596 A1 * | 12/2004 | Rajkotia et al. | 455/561 |

OTHER PUBLICATIONS

European International Search Report EP 05 25 1774 dated Jul. 28, 2005.

* cited by examiner

*Primary Examiner*—Daniel J Ryman
*Assistant Examiner*—Brian Roberts

(57) ABSTRACT

The present invention provides a method of generating a public long code mask. The method includes generating a code mask for coding transmissions over a traffic channel based on at least one frequency differentiator indicative of a frequency range, at least one band class differentiator indicative of a band class, and at least one traffic channel differentiator indicative of a traffic channel.

20 Claims, 2 Drawing Sheets

METHOD OF GENERATING A PUBLIC LONG CODE MASK

BACKGROUND OF THE INVENTION

1. Field of the Invention

This invention relates generally to telecommunication, and, more particularly, to a wireless telecommunication system.

2. Description of the Related Art

The coverage area of a wireless communication system is typically divided into a number of cells, which may be grouped into one or more networks. Mobile units, such as mobile telephones, personal data assistants, Global Positioning System devices, desktop or laptop computers, and the like, located in each cell may access the wireless communications system by establishing a wireless communication link with a base station associated with the cell. For example, a mobile telephone may initiate communication with a base station by providing a signal on an access channel. The base station may then use the received access channel signal to establish the wireless communication link between the mobile unit and the base station on a separate traffic channel.

At any given time, each base station may be expected to maintain concurrent wireless communication links with numerous mobile units. To reduce interference between the concurrent wireless communication links, the base station and the mobile units in the wireless communication system modulate signals transmitted on the assigned traffic channels using a predetermined code that uniquely identifies the mobile unit. For example, in a wireless communication system operating according to the CDMA 2000 standard, a public long code mask may be used to differentiate reverse link transmissions, i.e. from the mobile unit to the base station, over different traffic channels. The public long code mask is typically a 42-bit-long mask including two bits that indicate the type of the long code mask (public or private), an additional eight bits that provide signaling information such as the method used to form the long code mask, and a 32-bit electronic serial number (often referred to using the acronym ESN) assigned to the mobile unit.

The proliferation of various types of mobile units has begun to exhaust the supply of 32-bit electronic serial numbers. To accommodate the growing number of mobile units, many practitioners have proposed replacing the 32-bit electronic serial number with a 56-bit mobile equipment identifier (often referred to using the acronym MEID: Mobile Equipment IDentifier). Although the need to transition to the 56-bit mobile equipment identifier is widely accepted and incorporated in the IS-2000 standard, no consensus has developed regarding how to modify the aforementioned 42-bit public long code mask to accommodate the proposed 56-bit mobile equipment identifier. One possible technique is to map the 56-bit mobile equipment identifier to a 24-bit value and then to concatenate an 8-bit value to the 24-bit value to form a 32-bit pseudo-ESN. However, this pseudo-ESN method does not result in a sufficient number of distinct public long code masks to prevent an undesirable number of collisions between mobile units.

The public long code mask may alternatively be generated using a base station identifier (sometimes referred to using the acronyms BS_ID or BASE_ID), a Walsh code, and a 9-bit string (sometimes referred to as a PN offset) that differentiates one base station from a neighboring base station. If a call is in handoff, all handoff legs need to use the same public long code mask, i.e. a public long code mask assigned by the primary leg. However, the public long code mask needs to be changed whenever a new primary assumes control of the call, e.g. when a primary transfer occurs, so that the old primary may reuse the Walsh code once the old primary drops off the call. Otherwise, two mobile units on two different calls may be assigned the same public long code mask, which may cause crosstalk between the two concurrent wireless communication links.

During an inter-frequency handoff from a first frequency (F1) to a second frequency (F2) within a sector, the public long code mask generated by a base station typically changes after the inter-frequency hand-off. For example, a mobile unit that has established a first wireless communication link with a first base station (BS1), with a first PN offset (PN_Offset1), on a first carrier frequency (F1) using a first Walsh code (W1) may have a public long code mask of [BS1, PN_Offset1, W1]. The inter-frequency handoff moves the first wireless communication link from the first carrier frequency (F1) to the second carrier frequency (F2) in the same sector (BS1, PN_Offset1). The first base station (B1) assigns the first wireless communication link a second Walsh code (W2). Thus, the new public long code mask may be [BS1, PN_Offset1, W2].

The new public long code mask may be transmitted to the mobile unit either during or after the inter-frequency handoff. If the new public long code mask is transmitted to the mobile unit during the time-critical handoff phase, the additional time delay needed to transmit the public long code mask may increase the number of handoff failures. On the other hand, if the new public long code mask is not transmitted to the mobile unit until after the inter-frequency handoff, the number of collisions may be increased. For example, immediately after the handoff, but before the new public long code mask has been transmitted to the mobile unit, the second carrier frequency (F2) will also be using the public long code mask [BS1, PN_Offset1, W1]. In the meantime, a second wireless communication link that has previously been established in the same sector on the second carrier frequency (F2) may be using the Walsh code (W1). The base station identifier and pilot PN offset should be the same for all carriers in the same sector, so it is very likely that the public long code mask of the second wireless communication link may be [$BS_1$, PN_Offset1, W1]. Consequently, it is very likely that the first wireless communication link will collide with the second wireless communication link during the inter-frequency handoff.

The present invention is directed to addressing the effects of one or more of the problems set forth above.

SUMMARY OF THE INVENTION

In one embodiment of the instant invention, a method is provided for generating a public long code mask. The method includes generating a code mask for coding transmissions over a traffic channel based on at least one frequency differentiator indicative of a frequency range, at least one band class differentiator indicative of a band class, and at least one traffic channel differentiator indicative of a traffic channel.

In another embodiment of the present invention, a method is provided for performing an inter-frequency hand-off. The method includes receiving an indication that an inter-frequency handoff from a first frequency range to a second frequency range is to be initiated and generating, in response to receiving the indication, a code mask for coding transmissions over a traffic channel based on at least one frequency differentiator indicative of the second frequency range, at least one band class differentiator indicative of a band class, and at least one traffic channel differentiator indicative of a traffic channel. The method also includes performing the inter-frequency handoff from the first frequency to the second frequency and transmitting the code mask.

In yet another embodiment of the present invention, a method is provided for coding transmission. The method includes receiving a code mask for coding transmissions over a traffic channel based on at least one frequency differentiator indicative of a frequency range, at least one band class differentiator indicative of a band class, and at least one traffic channel differentiator indicative of a traffic channel. The method also includes transmitting over the traffic channel using the received code mask.

BRIEF DESCRIPTION OF THE DRAWINGS

The invention may be understood by reference to the following description taken in conjunction with the accompanying drawings, in which like reference numerals identify like elements, and in which.

Figure 1:
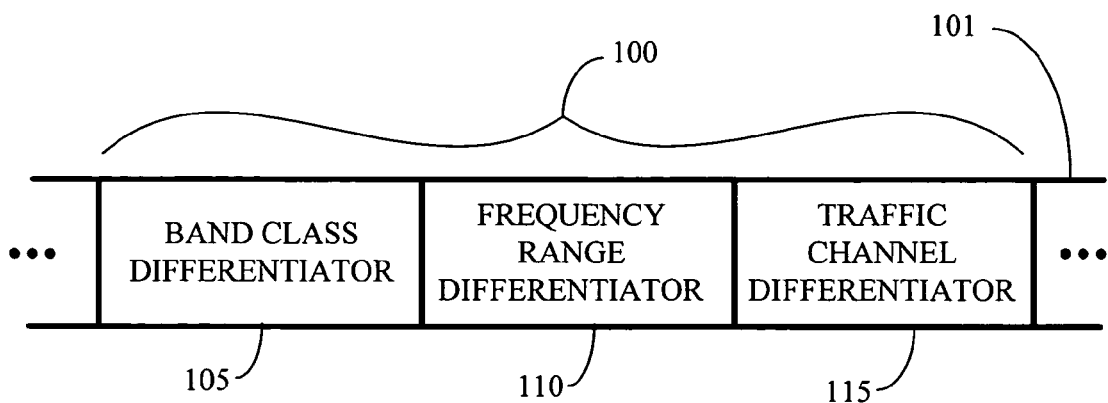
FIG. 1 conceptually illustrates a portion of a code mask, such as a public long code mask, which may be used to differentiate between various transmissions over channels of one or more wireless communication links.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates a portion 100 of a code mask 101, such as a public long code mask, which may be used to differentiate between various transmissions over channels of one or more wireless communication links. The use of code masks is well known in the art of wireless communication and, in the interest of clarity, will not be discussed further herein. Although only the portion 100 of the code mask 101 is shown in FIG. 1, persons of ordinary skill in the art will appreciate that the code mask 101 may include other elements not shown in the FIG. 1. For example, as will be discussed in detail below, the code mask 101 may include a type indicator, a signal indicator, a base station indicator, and the like.

The portion 100 includes a band class differentiator 105. Wireless communication links may be formed according to the specifications of a variety of band classes, such as the North American cellular band, cellular personal communication service (PCS) band, 1800-MHz band (IMT) band, and the like. In one embodiment, the band class differentiator 105 indicates a band class being used to form the wireless communication link. In one embodiment, the band class differentiator 105 is a five-bit number indicating the band class. For example, a band class differentiator 105 for the North American cellular band may be 00000.

The code mask portion 100 also includes a frequency range differentiator 110. In one embodiment, the frequency range differentiator 105 is a channel number indicative of a particular frequency range that may be used to form a channel of a wireless communication link. For example, the North American cellular band is divided into a plurality of frequency ranges, such as the frequency range of about 869-894 MHz, which may be used to form a wireless communication link. Each frequency range in the North American cellular band is indicated by a channel number ranging from 1-1024. Accordingly, the frequency range differentiator 105 in this embodiment may be a string of at least 10 bits. However, any desirable number of bits may be used to form the frequency range differentiator 105. For example, the frequency range differentiator 105 may be an 11-bit string.

The traffic channel differentiator 115 is also included in the code mask portion 100. In one embodiment, the traffic channel differentiator 115 is a Walsh code. The use of Walsh codes to differentiate traffic channels is well-known in the art of wireless communication and, the interest of clarity, will not be discussed further. However, persons of ordinary skill in the art will appreciate that the present invention is not limited to Walsh codes and, and alternative embodiments, other traffic channel differentiators 115 may be used.

The probability of a collision during an inter-frequency handoff from one base station to another may be reduced by forming the code mask 101 using the band class differentiator 105, the frequency range differentiator 110, and the traffic channel differentiator 115. For example, if a mobile unit establishes a first wireless communication link with a first base station that implements the present invention, the first base station may assign a public long code mask of [BC1, F1, W1] corresponding to a first band class (BC1), a first carrier frequency (F1), and a first Walsh code (W1). The inter-frequency handoff to a second base station moves the first wireless communication link to a second carrier frequency (F2), where the first wireless communication link is assigned a second Walsh code (W2). Thus, the new public long code mask may be [BC2, F2, W2].

Immediately after the handoff, but before the new public long code mask has been transmitted to the mobile unit, the first wireless communication link on the second carrier frequency (F2) may still be using the public long code mask [BC1,F1,W1]. However, even if a second concurrent wireless communication link in the same band class (BC1) on the second carrier frequency (F2) has been assigned the same Walsh code (W1), the public long code mask of the first wireless communication link [BC1,F1,W1] will be different than the public long code mask of the second wireless communication link [BC1,F2,W1]. Consequently, the probability that transmissions on the first wireless communication link will collide with transmissions on the second wireless communication link during the inter-frequency handoff is reduced relative to other proposed public long code mask assignment schemes, such as discussed above.

In one embodiment, the original Walsh code (W1) is not immediately reused on the first carrier frequency (F1) after the primary leg of the first carrier frequency is no longer in the call. Instead, the original Walsh code may be assigned to a new wireless communication link after a predetermined time delay. For example, a guard timer may be provided such that the original Walsh code (W1) becomes available for re-assignment after the guard timer expires. The exact duration of the time delay, or the guard timer, is a matter of design choice and may depend on many factors. For example, the duration of the guard timer should be long enough to allow the first wireless communication link to substantially finish establishing the new public long code mask with the mobile station. Accordingly, the probability of collisions between the first wireless communications link and other concurrent wireless communication links on the first carrier frequency during the inter-frequency handoff may be reduced in embodiments that include the guard timer.

FIGS. 2-6 conceptually illustrate five alternative embodiments of the code mask 101. In practice, the number and/or order of the bits in the portion 100 of the code mask 101, as well as the number and/or order of bits in other portions (not shown in FIG. 1) of the code mask 101, may vary depending on the particular implementation of the code mask 101. Accordingly, the embodiments shown in FIGS. 2-6 are intended to be exemplary of the variety of possible implementations of the code mask 101. However, persons of ordinary skill in the art will appreciate that an almost infinite number of possible bit arrangements are possible, and thus the embodiments shown in FIG. 2-6 are not intended to limit the present invention.

Figure 2:
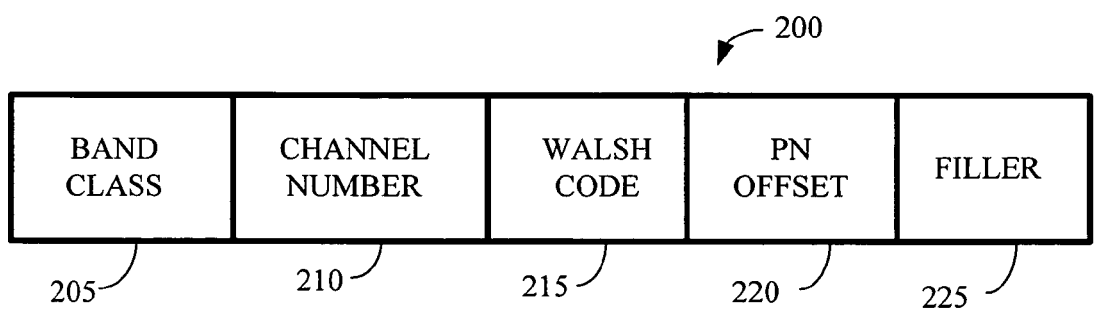
FIG. 2 conceptually illustrates a first exemplary embodiment of a public long code mask, such as the code mask shown in FIG. 1.

FIG. 2 conceptually illustrates a first exemplary embodiment 200 of a public long code mask, such as the code mask 101 shown in FIG. 1. The first exemplary embodiment 200 includes a band class 205, a channel number 210, and a Walsh code 215. The band class 205 includes a plurality of bits that may be used to differentiate between possible band classes. For example, the band class 205 may comprise five bits indicative of a particular band class, such as the North American cellular band. The channel number 210 includes a plurality of bits used to differentiate between ranges of frequencies that may be used to form a wireless communication channel. For example, the channel number 210 may comprise 11 bits indicative of a frequency range used to form a wireless communication channel. The Walsh code 215 includes a plurality of bits indicative of a corresponding plurality of Walsh codes, which may be used to differentiate between traffic channels. For example, the Walsh code 215 may comprise eight bits.

The first exemplary embodiment 200 may also include additional bits indicative of other characteristics of the base station, the mobile unit, the traffic channel, and the like. For example, the first exemplary embodiment 200 includes a PN offset 220. The first exemplary embodiment 200 may also include one or more filler bits 225. In various alternative embodiments, the filler bits 225 may include bits indicative of the type of the long code mask (public or private), signaling information such as the method used to form the long code mask, and the like. As indicated in FIG. 2, the first exemplary embodiment 200 may be formed by concatenating the band class 205, the channel number 210, Walsh code 215 and, if present, the PN offset 220 and/or the one or more filler bits 225.

Figure 3:
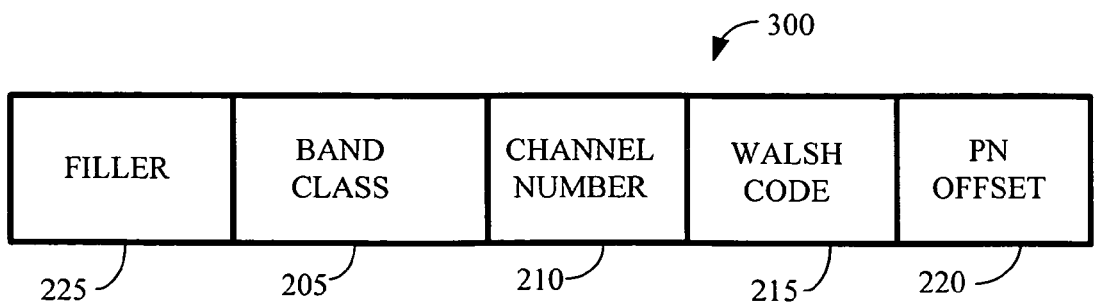
FIG. 3 conceptually illustrates a second exemplary embodiment of a public long code mask, such as the code mask shown in FIG. 1.

FIG. 3 conceptually illustrates a second exemplary embodiment 300 of the public long code mask, which comprises the same elements as the first exemplary embodiment 200, but provides these elements in a different order. In particular, the second exemplary embodiment 300 may be formed by concatenating the one or more filler bits 225 (if present), the band class 205, the channel number 210, Walsh code 215 and, if present, the PN offset 220. Persons of ordinary skill in the art will appreciate that the ordering of the elements in the second exemplary embodiment 300 is merely intended to illustrate one possible alternate ordering. In various alternative embodiments, the elements may be concatenated in any desirable order.

Figure 4:
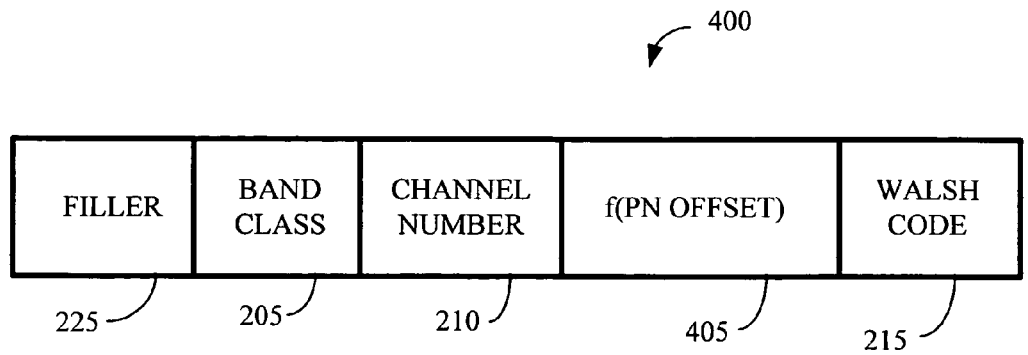
FIG. 4 conceptually illustrates a third exemplary embodiment of a public long code mask, such as the code mask shown in FIG. 1.

FIG. 4 conceptually and illustrates a third exemplary embodiment 400 of the public long code mask. The third exemplary embodiment 400 differs from the second exemplary embodiment 300 in that the PN offset 220 has been encoded (e.g. using a block cipher such as DES), permutated (e.g. using a pair-wise independent permutation), or otherwise functionally manipulated to form the third exemplary embodiment 400, as indicated by the function $\int(PN\ Offset)$ 405. Although the third exemplary embodiment 400 shows encoding, permutating, or manipulating of the PN offset 220, persons of ordinary skill in the art will appreciate that any portion of (or combination of) the one or more filler bits 225 (if present), the band class 205, the channel number 210, Walsh code 215 may be encoded, permutated, or otherwise functionally manipulated to form the third exemplary embodiment 400.

Figure 5:
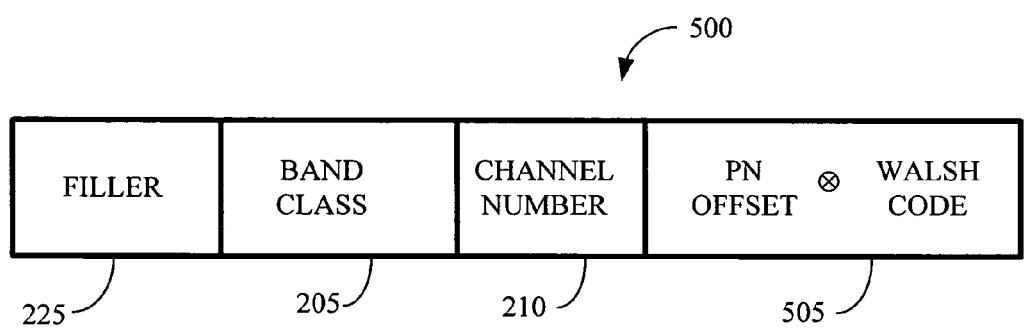
FIG. 5 conceptually illustrates a fourth exemplary embodiment of a public long code mask, such as the code mask shown in FIG. 1.

FIG. 5 conceptually and illustrates a fourth exemplary embodiment 500 of the public long code mask. The fourth exemplary embodiment 500 differs from the second exemplary embodiment 300 in that the Walsh code is multiplexed with the PN offset in a predetermined manner to form a multiplexed PN offset/Walsh code 505. Persons of ordinary skill in the art will appreciate that any desirable multiplexing scheme may be used to form the multiplexed PN offset/Walsh code 505. Moreover, any desirable portion of (or combination of) the band class 205, the channel number 210, the filler bits 225, and the PN offset/Walsh code 505 may be multiplexed and/or concatenated in any desirable order to form the fourth exemplary embodiment 500.

Figure 6:
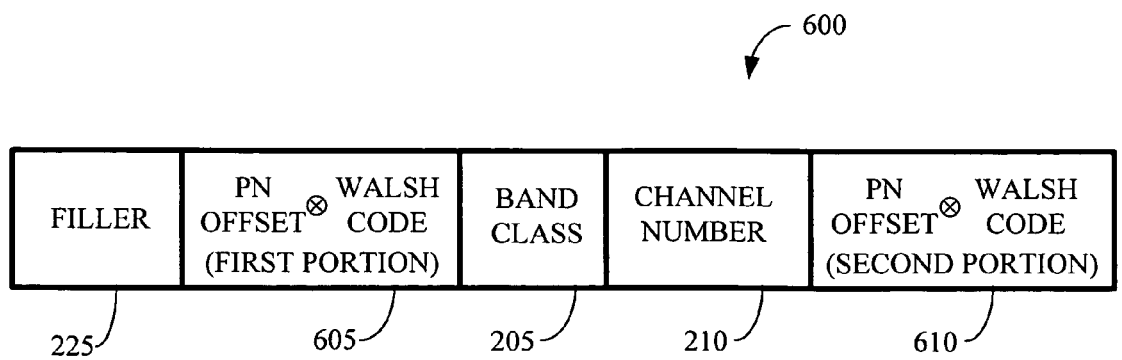
FIG. 6 conceptually illustrates a fifth exemplary embodiment of a public long code mask, such as the code mask shown in FIG. 1.

FIG. 6 conceptually and illustrates a fifth exemplary embodiment 600 of the public long code mask. The fifth exemplary embodiment 600 differs from the fourth exemplary embodiment 500 in that the multiplexed PN offset/Walsh code has been divided into first and second portions 605, 610 of the multiplexed PN offset/Walsh code. The first and second portions 605, 610 may be arranged in fifth exemplary embodiment 600 in a discontinuous manner, as shown in FIG. 6. Moreover, persons of ordinary skill in the art will appreciate that the band class 205, the channel number 210, the filler bits 225, and any other desirable part of the fifth exemplary embodiment 600 may also be arranged in a discontinuous manner.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of assigning code masks for wireless communication in a system that supports transmission in multiple frequency ranges, comprising:
generating a code mask for coding transmissions over a traffic channel based on at least one frequency differentiator indicative of a first frequency range that is one of the multiple supported frequency ranges, at least one band class differentiator indicative of a band class, and at least one traffic channel differentiator indicative of a traffic channel; and
transmitting a message indicative of the generated code mask from a base station assigning the traffic channel to a mobile unit.

2. The method of claim 1, wherein the at least one traffic channel differentiator comprises a Walsh code assigned to the traffic channel.

3. The method of claim 1, wherein the at least one frequency differentiator comprises a channel number indicative of the first frequency range that is one of the multiple supported frequency ranges.

4. The method of claim 1, wherein the at least one band class differentiator comprises a band class number.

5. The method of claim 1, wherein generating the code mask comprises combining the at least one frequency differentiator, the at least one band class differentiator, and the at least one traffic channel differentiator.

6. The method of claim 5, wherein combining the at least one frequency differentiator, the at least one band class differentiator, and the at least one traffic channel differentiator comprises concatenating the at least one frequency differentiator, the at least one band class differentiator, and the at least one traffic channel differentiator in a desired order.

7. The method of claim 6, wherein concatenating the at least one frequency differentiator, the at least one band class differentiator, and the at least one traffic channel differentiator comprises arranging one or more strings of bits in a discontinuous manner.

8. The method of claim 5, wherein combining the at least one frequency differentiator, the at least one band class differentiator, and the at least one traffic channel differentiator comprises at least one of multiplexing, encoding, permutating, and functionally manipulating at least a portion of at least one of the at least one frequency differentiator, the at least one band class differentiator, and the at least one traffic channel differentiator.

9. The method of claim 1, further comprising delaying re-assignment of the at least one traffic channel differentiator until after a predetermined time.

10. The method of claim 9, wherein delaying re-assignment of the at least one traffic channel differentiator until after the predetermined time comprises delaying re-assignment of the at least one traffic channel differentiator until after a guard timer expires.

11. A method of assigning code masks for wireless communication in a system that supports inter-frequency handoffs between multiple frequency ranges, comprising:
receiving an indication that an inter-frequency handoff from a first frequency range to a second frequency range is to be initiated for a mobile unit that is assigned a first code mask formed based on at least one frequency differentiator indicative of the first frequency range;
generating, in response to receiving the indication, a second code mask for coding transmissions over a traffic channel based on at least one frequency differentiator indicative of the second frequency range, at least one band class differentiator indicative of a band class, and at least one traffic channel differentiator indicative of a traffic channel;
performing the inter-frequency handoff from the first frequency to the second frequency; and
transmitting the second code mask to the mobile unit.

12. The method of claim 11, wherein transmitting the second code mask comprises transmitting the second code mask after performing the inter-frequency handoff from the first frequency range to the second frequency range.

13. The method of claim 11, wherein transmitting the second code mask comprises transmitting the second code mask during the inter-frequency handoff from the first frequency range to the second frequency range.

14. The method of claim 11, wherein receiving the indication comprises receiving an indication transmitted from a mobile unit to a base station.

15. The method of claim 11, wherein the at least one traffic channel differentiator comprises a Walsh code assigned to the traffic channel, the at least one frequency differentiator comprises a channel number indicative of the second frequency range, and the at least one band class differentiator comprises a band class number.

16. The method of claim 11, wherein generating the second code mask comprises combining the at least one frequency differentiator, the at least one band class differentiator, and the at least one traffic channel differentiator.

17. The method of claim 11, further comprising assigning the at least one traffic channel differentiator to a new wireless communication link after a predetermined time.

18. A method of wireless communication using code masks in a system that supports transmission in multiple frequency ranges, comprising:
receiving a code mask for coding transmissions over a traffic channel based on at least one frequency differentiator indicative of a first frequency range selected from the multiple supported frequency ranges, at least one band class differentiator indicative of a band class, and at least one traffic channel differentiator indicative of a traffic channel; and
transmitting over the traffic channel using the received code mask.

19. The method of claim 18, wherein receiving the code mask comprises receiving the code mask during or after an inter-frequency handoff.

20. The method of claim 19, wherein receiving the code mask comprises receiving a code mask that is different than a previous code mask used before or during the inter-frequency handoff.

* * * * *

UNITED STATES PATENT AND TRADEMARK OFFICE
CERTIFICATE OF CORRECTION

PATENT NO.       : 7,577,086 B2
APPLICATION NO.  : 10/824216
DATED            : August 18, 2009
INVENTOR(S)      : Meier et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1497 days.

Signed and Sealed this

Seventh Day of September, 2010

David J. Kappos
*Director of the United States Patent and Trademark Office*